(12) United States Patent
Willis et al.

(10) Patent No.: US 11,754,385 B2
(45) Date of Patent: Sep. 12, 2023

(54) STRAIN MONITOR

(71) Applicant: AQUATEC GROUP LIMITED, Basingstoke (GB)

(72) Inventors: Andrew Willis, Lee-on-the-Solent (GB); Nicolas Lefebvre, Basingstoke (GB); Andrew Smerdon, Hartley Wintney (GB); Tony Mekky, Andover (GB)

(73) Assignee: AQUATEC GROUP LIMITED, Basingstoke (GB)

( * ) Notice: Subject to any disclaimer, the term of this patent is extended or adjusted under 35 U.S.C. 154(b) by 14 days.

(21) Appl. No.: 17/495,961

(22) Filed: Oct. 7, 2021

(65) Prior Publication Data
US 2022/0107168 A1     Apr. 7, 2022

(30) Foreign Application Priority Data

Oct. 7, 2020  (GB) ..................................... 2015923

(51) Int. Cl.
*G01B 5/30*   (2006.01)
*G01B 7/16*   (2006.01)
(Continued)

(52) U.S. Cl.
CPC ................. *G01B 5/30* (2013.01); *G01B 7/16* (2013.01); *B63B 75/00* (2020.01); *B63B 79/10* (2020.01);
(Continued)

(58) Field of Classification Search
CPC .......... G01B 5/30; G01B 7/16; G01B 5/0004; G01B 7/18; G01B 5/0002; B63C 11/52; B63B 75/00; B63B 79/10; G01L 5/00
See application file for complete search history.

(56) References Cited

U.S. PATENT DOCUMENTS 3,965,736 A * 6/1976 Welton .................. E21B 47/007
                                              73/152.61
4,090,405 A    5/1978 McKee
(Continued)

FOREIGN PATENT DOCUMENTS

EP     0160355 A2    11/1985
GB     2187294 A      9/1987
(Continued)

OTHER PUBLICATIONS

"European Search Report," received in United Kingdom Patent Application No. GB 2015923.2, completed Apr. 8, 2021 (4 pages).

*Primary Examiner* — Alexander A Mercado
*Assistant Examiner* — John M Royston
(74) *Attorney, Agent, or Firm* — Tillman Wright, PLLC; James D. Wright; David R. Higgins

(57) ABSTRACT

A strain monitor (1) for attachment to part of a submerged structure (100), the strain monitor comprises: a main body (5), the main body comprising an attachment assembly which is arranged to secure the strain monitor to the submerged structure, a plurality of strain gauge assemblies (3), carried by the main body, arranged in a spaced apart relationship, each strain gauge assembly comprising a strain gauge and a carrier (6), and the strain gauge attached to the carrier, and the strain gauge assembly arranged to selectively adopt a stowed condition and a deployed condition.

12 Claims, 14 Drawing Sheets

(51) Int. Cl.
 *B63C 11/52* (2006.01)
 *G01B 5/00* (2006.01)
 *B63B 79/10* (2020.01)
 *B63B 75/00* (2020.01)
 *G01L 5/00* (2006.01)

(52) U.S. Cl.
 CPC ............ *B63C 11/52* (2013.01); *G01B 5/0002* (2013.01); *G01B 5/0004* (2013.01); *G01B 7/18* (2013.01); *G01L 5/00* (2013.01)

(56) References Cited

U.S. PATENT DOCUMENTS

| | | | | |
|---|---|---|---|---|
| 5,461,757 | A * | 10/1995 | Leifeld | D01H 13/22 19/239 |
| 9,778,118 | B2 * | 10/2017 | Campbell | G01N 25/00 |
| 2016/0097674 | A1 * | 4/2016 | Zusman | G01H 11/08 73/658 |

FOREIGN PATENT DOCUMENTS

| | | | |
|---|---|---|---|
| GB | 2561375 | A | 10/2018 |
| WO | 2014031008 | A1 | 2/2014 |

\* cited by examiner

STRAIN MONITOR

CROSS REFERENCE TO RELATED APPLICATIONS

This application claims the benefit of United Kingdom Patent Application No. GB 2015923.2, filed Oct. 7, 2020, which application and any publication thereof are incorporated by reference herein.

TECHNICAL FIELD

The present invention relates to strain gauge assemblies for attachment to submerged structures.

BACKGROUND

Offshore structures, such as those used in the oil and gas industries, comprise a platform which is supported by a submerged support structure which is attached to the seabed. For such structures which have been in use for some time it can be important to monitor the structural stability thereof. The data gathered can be used for example to aid in the calibration of models that will inform decisions regarding demanning of the platform in the event of extreme weather. The data gathered could also beneficially be used for other purposes.

We have devised an improved strain monitoring assembly, which is suitable for monitoring a submerged structure with an objective to remove the need for otherwise more difficult and dangerous operations within the perimeter of the jacket structure itself.

SUMMARY

According to the invention there is provided a strain monitor for attachment to part of a submerged structure, the strain monitor comprises:
a main body,
a support assembly comprising an attachment assembly which is arranged to secure the strain monitor to the submerged structure,
a plurality of strain gauge assemblies, carried by the main body,
each strain gauge assembly comprising a strain gauge and a carrier, and the strain gauge attached to the carrier, and the strain gauge assembly arranged to selectively adopt a stowed condition and a deployed condition.

The strain monitor may be configured to be attached to at least an outwardly facing part of the submerged structure.

The strain monitor may be configured so that it can be attached to the submerged structure from only side, or one side region, of the structure. This may obviate the need to perform any installation steps from both sides of the submerged structure, which allows for ease of installation and improved safety during installation.

The strain monitor may be capable of being secured to the submerged structure from one side only, which is outside of the spatial envelope defined by the structure, thus avoiding more risky procedures internally of the structure The carrier may be arranged to bear against the part of the submerged structure. The carrier may comprise a number of contact formations which are arranged to bear against the submerged structure, with the strain gauge assembly in a deployed condition.

When we refer to an outwardly facing part of the submerged structure, we may include that surface or surface region of the structure (which may be of any profile, flat, squared, curved, smooth, uneven, a combination of those), faces or is directed away generally away from the structure itself.

The strain monitor may be arranged to be capable of being attached from a region outward of the submerged structure, for example from open water. It may not be necessary to perform any attachment or deployment steps internally of the submerged structure.

The strain monitor may be arranged to extend partially around the submerged structure.

When we refer to the strain monitor in use extending partially around the part of the submerged structure, we may include that it extends not all of way or extent around the part of the submerged structure. It may be the support assembly which extends (only) part way around the structure part. Said part of the submerged structure may be referred to as a structural part or structural member.

The strain monitor may be used to monitor the structural integrity of a submerged structure to which it is installed.

The strain monitor may be arranged to be installed to the submerged structure from substantially one only side of the strain monitor.

The strain monitor may be arranged to be installed by an underwater ROV (remotely operated vehicle) or by a diver/human. The ROV may be controllable by way of an umbilical or cable which connects the ROV to a controller. The controller may be above a waterline.

The strain monitor may comprise one or more features which are intended to be used by the ROV for installation and/or detachment of the strain monitor to and/or from the submerged structure, and/or operation of the strain monitor. Such features may include a formation which is arranged to be gripped by a manipulator of the ROV so as to hold and/or move and/or position the strain monitor. Such features may also or alternatively include controls which are arranged to be used by the ROV.

The strain monitor may include a detachment assembly which allows or assists an ROV to detach the strain monitor from the submerged structure. The detachment assembly may comprise a pivoted component which comprises a handle or control, and which is such that on pivoting of the handle/control, a portion of the monitor bears against the submerged structure and urges the strain monitor to become detached from said structure, by way of leverage. The detachment assembly may be pivotably mounted to the support assembly. The detachment assembly may be arranged to be operable by an ROV.

The strain monitor may include a control arranged to allow an ROV to cause the or a respective strain gauge carrier or all strain gauge assemblies (where there are multiple) to move from a stowed condition to a deployed condition, and/or vice versa. The control may comprise a rotatable switch, arranged to be operable by an ROV, and/or by a human. More generally, an actuator may be used (which need not necessarily be a rotatable switch).

The submerged structure may be a support structure of an offshore platform, such as a platform for extracting oil from beneath the seabed used by the oil and gas exploration and production industries. Such platforms typically comprise a deck which is attached to an underlying structure, which may comprise a support framework, which has its feet on the seabed. The support structure may be described as a jacket. The submerged structure may comprise, for example, a pipeline, offshore wind monopile, floating structure and/or a subsea wellhead.

The part of the submerged structure to which the strain monitor is to be attached may be a tubular member. The part to which the strain monitor is arranged to be attached may comprise a brace member. The structural part may be described as a structural member. The part may have a curved or rounded outward surface.

At least some of the strain gauge assemblies may be substantially equally spaced from one another. They may be spaced apart by substantially the same distance. The multiple strain gauge assemblies may be located at different points on an arc, or may be located at different points along a line, or may located at different points on a two dimensional plane (such that they need not necessarily occupy locations along a line).

The main body of the strain monitor may comprise a framework or carcass. The main body may be a rigid structure. The main body may be described as a support assembly.

The main body may comprise a side (region or portion) or a face (region or portion) which is arranged to be positioned opposite or adjacent to the part (which may be an outward surface) of the submerged structure. Said side or face may be directed towards the part to which the strain monitor is attached.

Said side/face may be of curved shape, and may be of concave shape. The side/face may be substantially semi-circular.

The strain monitor may be described as a brace clamp.

An opposite side (region or portion) or face (region or portion) of the support assembly may comprise, or be arranged to provide operational access to, features for at least one of: the installation of the strain monitor, deployment of the strain gauge assembly, detachment of the strain monitor from the submerged structure, retraction of the strain monitor from the submerged structure to a stowed condition, and/or data processing (for functionalities including one or more of those disclosed below).

Said opposite side or face may be directed away from or outwardly of the part of the structural assembly to which the strain monitor is attached.

The main body may be arranged to fit partially around, or partially embrace or surround, the submerged structure part.

The strain monitor may comprise a data collection module.

The data collection module may be detachably connectable to the main body.

The main body may be provided with a coupling or connector which is arranged to mechanically and electrically connect the module to the main body.

The coupling may provide a connection to the one or more strain gauges (for example so that strain data measured by the at least one strain gauge assembly can be processed and/or stored). The coupling may comprise a socket, which may be provided with multiple electrical terminals.

The data collection module may be arranged to effect at least one of the following functions: data processing, signal processing, data storage, data communication (externally of the strain monitor), power management.

The data collection module may comprise an emitter or a transceiver.

The data collection module may be termed an instrumentation pod.

The data collection module may comprise a communications port arranged to effect data or signalling to be output by the module and/or received as an input to the module. The communications port may be of a wired or wireless type. Wireless communication capability may include acoustic domain and/or optical domain communication types. Electromagnetic or radio frequency domain may additionally or alternatively be used.

The data collection module may be arranged to be connected to the main body by an ROV. The data collection module may comprise a handle arranged to be gripped by a manipulator of an ROV.

The main body may be arranged to allow multiple data processing modules to be attached/connected thereto.

The data collection module may comprise:
A data processor (termed CPU)
A Communications Driver
Amplifier and Filter
Analogue to Digital Converter (ADC)
Optional Instruments (such as thermal sensor, pressure Sensor and Accelerometer) Data Storage The data processor may be configured to manage the operation of the data acquisition (including timing), the storage of sampled data, conservation of power though effective power management, and retrieval of data, either though acoustic modem, optional optical modem or direct retrieval and download topside.

The carrier may be provided with a strain gauge on opposite sides of the carrier.

For the or each strain gauge assembly, two strain gauges may be arranged in a (Wheatstone) bridge circuit configuration.

The carrier may be provided with three contact portions or formations, which are arranged to bear against the structural part/member of the submerged structure.

The contact portions may be provided in a triangular configuration. Two contact formations may be provided at one distal end region of the carrier and one contact formation maybe be provided at an opposite end the carrier.

The contact formations may be provided on an underside of the carrier. The contact formations may comprise protrusions. The contact portions may be of substantially conical shape. The contact portions may comprise a pointed or tipped end, which is arranged to contact with part of the submerged structural assembly.

Each of the strain gauge assemblies may comprise a deployment assembly or sub-assembly which is arranged to bring the stain gauge assembly into a deployed condition and/or a stowed condition. This may be termed a strain gauge deployment mechanism.

The deployment assembly may comprise a spring, which when actuated is arranged to urge the strain gauge carrier into a deployed condition.

The deployment assembly may comprise a hydraulic chamber which is arranged to releasably retain a quantity of fluid, such that the strain gauge carrier is maintained in a stowed condition. The deployment assembly may comprise a valved port which when opened is arranged to allow the liquid to flow out from the chamber, and thereby permit the spring to urge the strain gauge carrier into a deployed condition. The rate of the liquid from the chamber may be modulated, so as to ensure a controlled transition from a stowed condition to a deployed condition.

The strain monitor may be arranged to be attached to the submerged structure by way of magnetic attraction. The strain monitor may comprise one or more magnets. The magnets may be provided at distributed positions on the main body.

The strain monitor may comprise a stand-off mechanism, which includes a moveable component which extends forwardly of the main body and which can be controlled to retract from that condition. When extending forwardly, the moveable component arranged to maintain the attachment means away from being attached to the structural part, in a spaced-apart relationship. This may be viewed as preventing the attachment assembly from attaching to the structural part (by virtue of the spacing). When the component is caused to retract from the forward position, the attachment assembly is then capable to cause the strain monitor to attach to the structural part.

There may be multiple sizes of the strain monitor, each configured, for example, to the diameter of brace pipe that it is intended for.

The invention may additionally comprise one or more features, either singularly or in combination, as described in the description and/or as shown in the drawings.

Further aspects of the invention may include a strain monitor which includes one more features described above, as described in the description below and/or as shown in the drawings.

BRIEF DESCRIPTION OF THE DRAWINGS

Various embodiments of the invention will now be described by way of example, in which.

DETAILED DESCRIPTION

There is now described a strain monitor, for use in structural integrity management of a submerged structure, such as the support structure of an offshore platform. What is now described is a novel apparatus and system which allows strain measurement in a structural member of such a structure to be easily and safely installed, and ensure accurate monitoring data is obtained.

Figure 1:
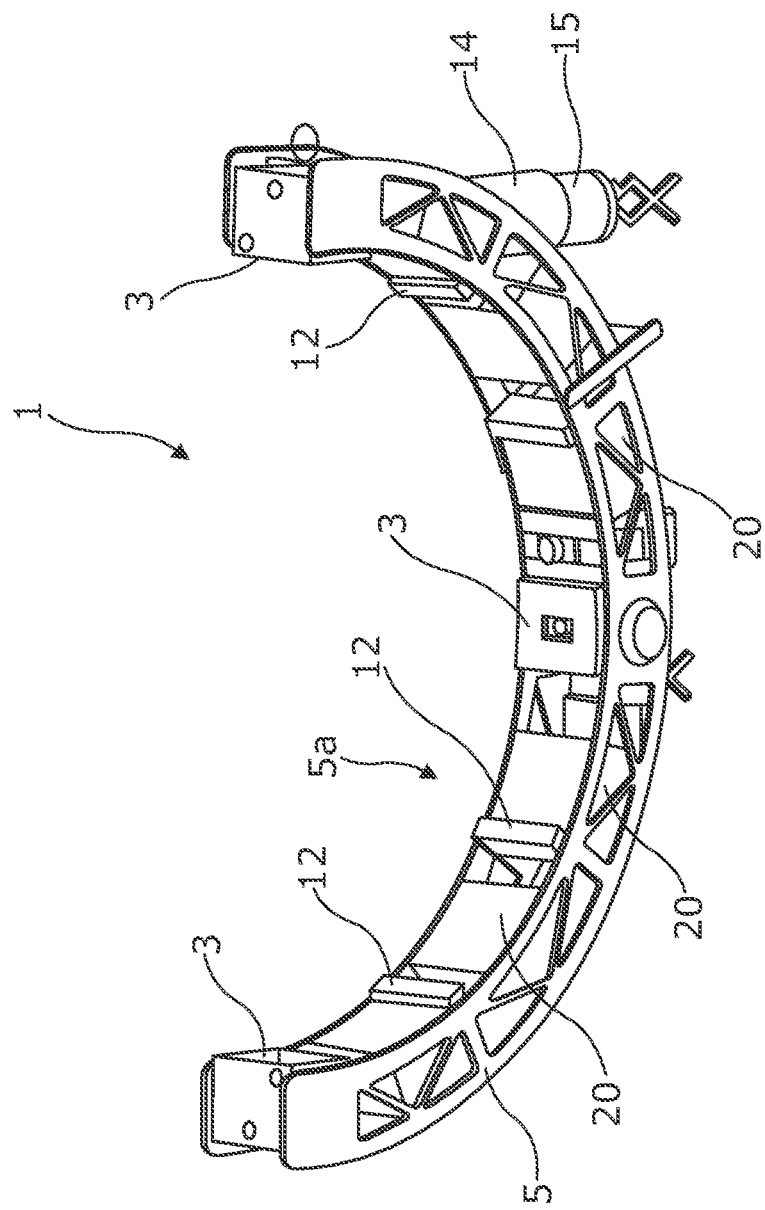
FIG. 1 is a perspective view of strain gauge monitor

In overview, the strain monitor 1 is arranged to attach magnetically to a brace member of an offshore platform, and comprises a half-circle shaped device which is installed by an ROV. The monitor 1 includes three strain gauges to allow monitoring of brace longitudinal strain at three locations, aligned at 90° to one another other. The strain monitor 1 further includes an ROV-removable data collection module which integrates the required electronics for enabling signal processing, data storage, communications, and power management electronics as well as a battery. The strain monitor 1 is advantageously configured so that it allows the installation from the outside of the platform jacket without the need to go inside of the jacket, minimising the risk for ROV operations Reference is made initially to FIG. 1 which shows the strain monitor 1 which includes three strain gauge assemblies 3. The assemblies 3 are mounted at equally angularly spaced positions on a rigid main body 5. The main body 5 is of substantially half-circle shape and has a concave inner side region 5a, which is arranged to be brought against an outward-facing surface of a brace member. The main body 5 also has an outer side region 5b.

Figure 3:
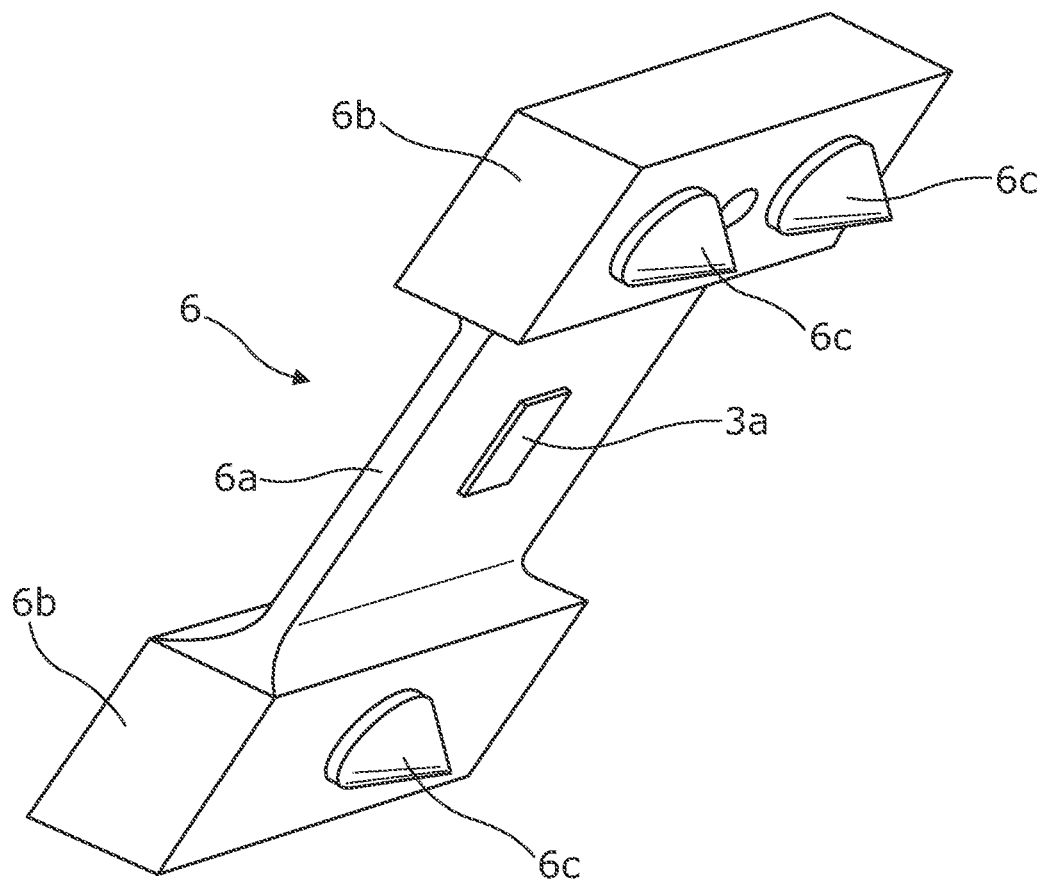
FIG. 3 is a perspective view of strain gauge mounted on a strain gauge carrier.

Each strain gauge assembly 3 comprises a strain gauge carrier 6. The carrier 6 of a strain gauge 3 as shown in FIG. 3, comprises a central web 6a, which is provided at each end thereof with a respective distal end portion 6b. Two strain gauges 3a are installed to the carrier and in particular are installed at the dimensionally central point of the web on opposite sides of the web 6a. Fitting two gauges isolates the longitudinal axis strain and helps exclude any bending effects from the output measurement.

One of the distal end portions 6b comprises a single contact portion 6c, which may be described as a pointed stud, of conical shape. The other distal end portion 6b of the carrier comprises two spaced-apart contact portions 6c. The three contact portions 6c are arranged in a triangular configuration.

Figure 4:
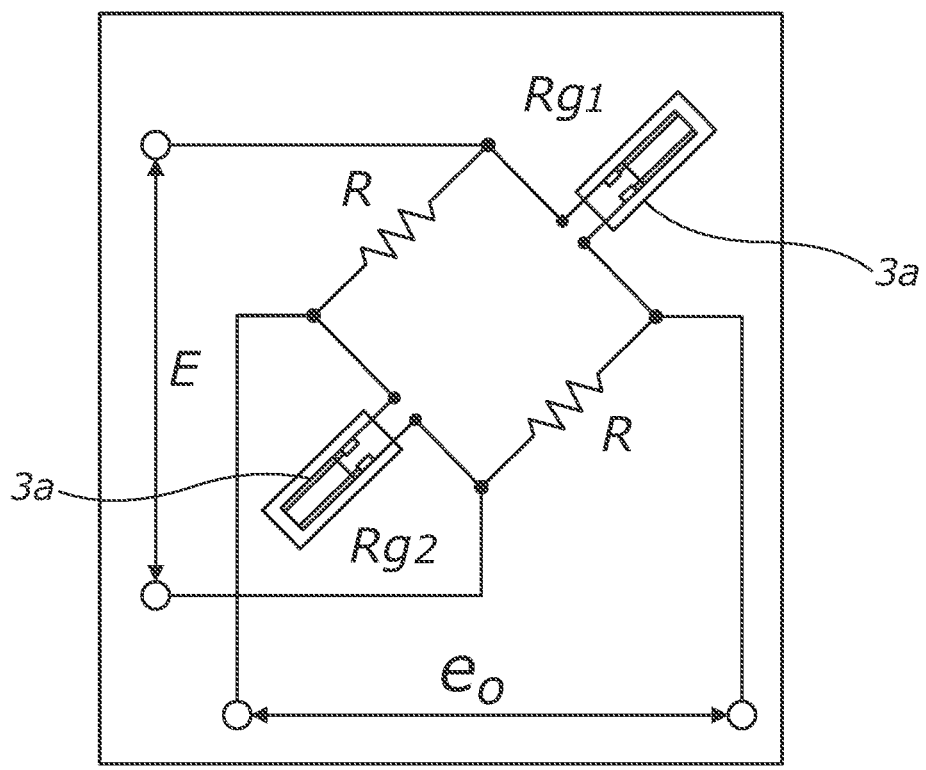
FIG. 4 is a circuit diagram of two strain gauges in a circuit.

Each pair of strain gauges 3a is connected in a half Wheatstone bridge circuit configuration, as shown in FIG. 4.

Each strain gauge 3a is mounted within a gauge housing 7, and incorporates a deployment mechanism. The housing 7 and, the deployment of an individual gauge is now described, followed by a description of the overall mechanism which deploys all the gauges. The methodology of the strain monitoring disclosed here creates a requirement for a reaction force (contact force) between the brace member and the strain carrier in order to transfer strain load from the brace member onto the strain carrier and so to the strain gauge. In order to realise this, a spring-loaded deployment mechanism is used. The housing 7 contains compression springs 7e and 7f which create contact force between the strain gauge carrier 6 and the brace pipe once the strain gauge has been deployed. This is achieved by applying a force to a load transfer block 7h. This block in turn presses the strain carrier out from the housing until the three contact portions 6c, or studs, contact the brace pipe with the required force. These may be made of a suitable (hard) material.

The housing 7 comprises, in broad terms, a hydraulic chamber which is arranged to releasably retain a quantity of fluid, such that the strain gauge carrier is maintained in a stowed condition. A valved port is provided which when opened is arranged to allow the liquid to flow out from the chamber, and thereby permit the springs 7e and 7f to urge the strain gauge carrier 6 into a deployed condition. The rate of the liquid from the chamber may be modulated or controlled, so as to ensure a gradual and smooth transition from a stowed condition to a deployed condition of the carrier is achieved.

Figure 5:
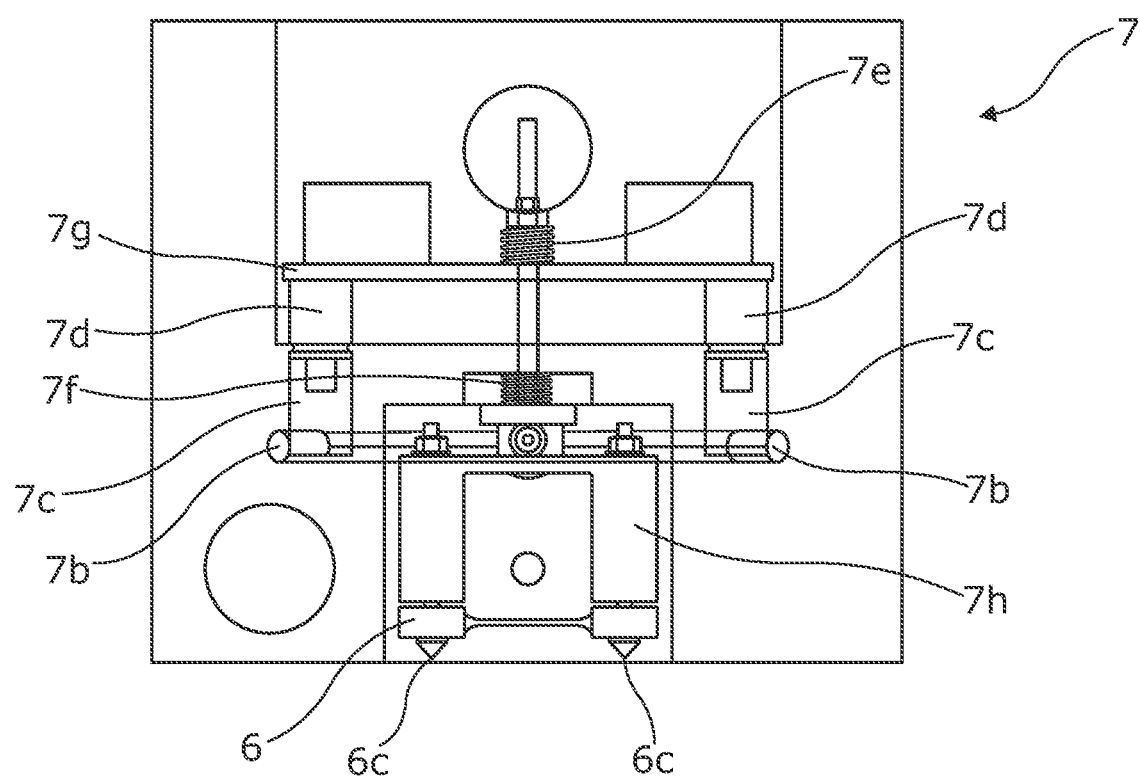
FIGS. 5, 6 and 7, are cross-sectional side views of a strain gauge housing with a strain gauge carrier transitioning from a stowed condition to a deployed condition.

FIG. 5 shows the strain gauge assembly 3 in its housing 7 in the retracted, or stowed, condition, in which the strain gauge (subassembly) is fully withdrawn into the housing. The hydraulic system is sealed at a valved port (not shown), which communicates with ports 7b for the cylinders 7c in which hydraulic pistons 7d are located. In this condition, the springs 7e and 7f are compressed.

Figure 6:
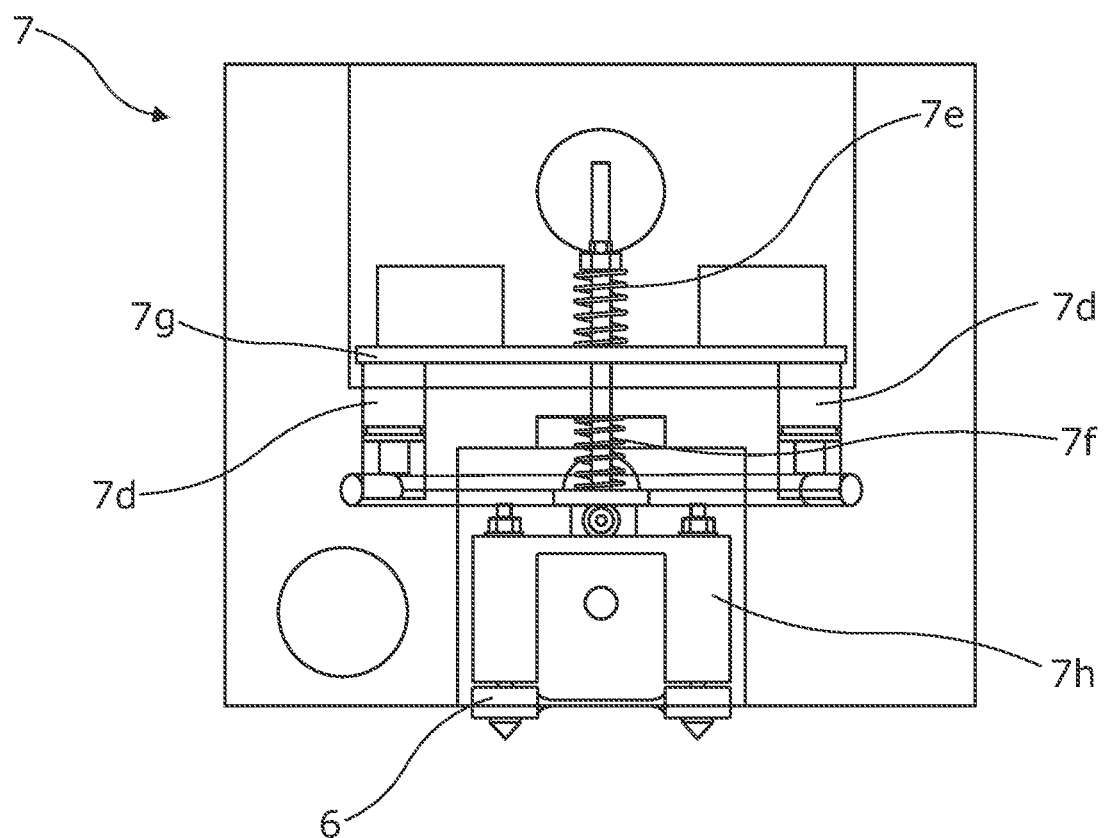

Referring now to FIG. 6, the assembly is in a partially deployed condition in which the strain gauge carrier has moved towards the brace member. The valved port has been opened and so hydraulic pressure will begin to drop inside the chambers 7c as water is purged by the force of the transfer plate springs 7e, and due to the reduction in pressure. The strain gauge carrier 6 begins to move slowly, with the rate of movement being controlled by pre-configured flow restrictor valves, not shown, downstream of the chamber ports to ensure that the rate of deployment motion is controlled.

Figure 7:
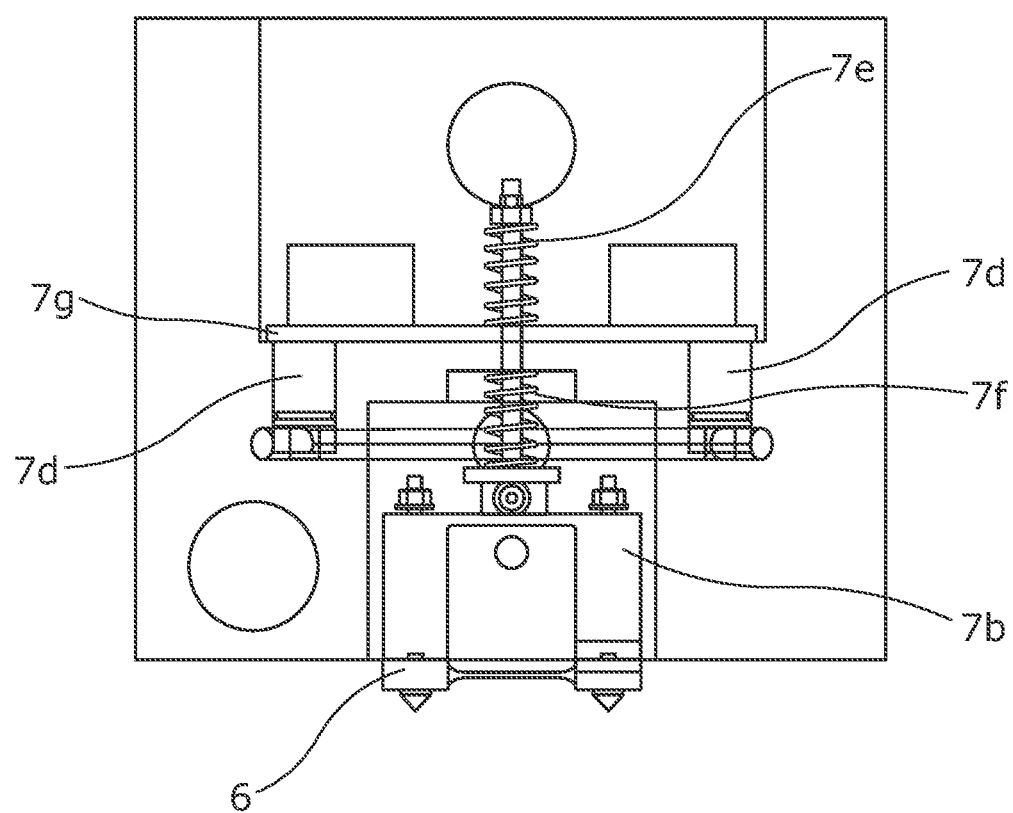

FIG. 7, shows the strain gauge assembly in a fully deployed condition, in which it has reached its final, fully extended position. The chambers 7c are fully purged and the pistons 7d are lowered and held in position by the fully extended transfer plate springs 7e. In this condition, the contacts 6c partially embed into the outer surface of the brace pipe, or more generally to impact frictional contact.

The strain gauge assemblies are provided in a stowed condition so as to protect from damage during shipping, lowering into the water and installation to the brace.

Once the clamp is fully positioned and magnetically locked onto the brace pipe, all three strain gauges are deployed simultaneously. The deployment is brought about by a rotatable switch 10. Once the switch 10 is turned by ¼ rotation, this controls a valve hydraulic pressure is released, allowing the transfer plate springs to extend and cause the transfer plate to move the strain gauge subassemblies slowly into their final deployed positions against the wall of the brace pipe, as described above. The quarter turn action switch includes an ROV or diver operable handle which will be coupled to a suitable valve.

The strain monitor 1 comprises a number of permanent magnets 12, with sufficient force such that the strain monitor 1 cannot become loose and slide along the tubular brace member once installed.

Figure 2:
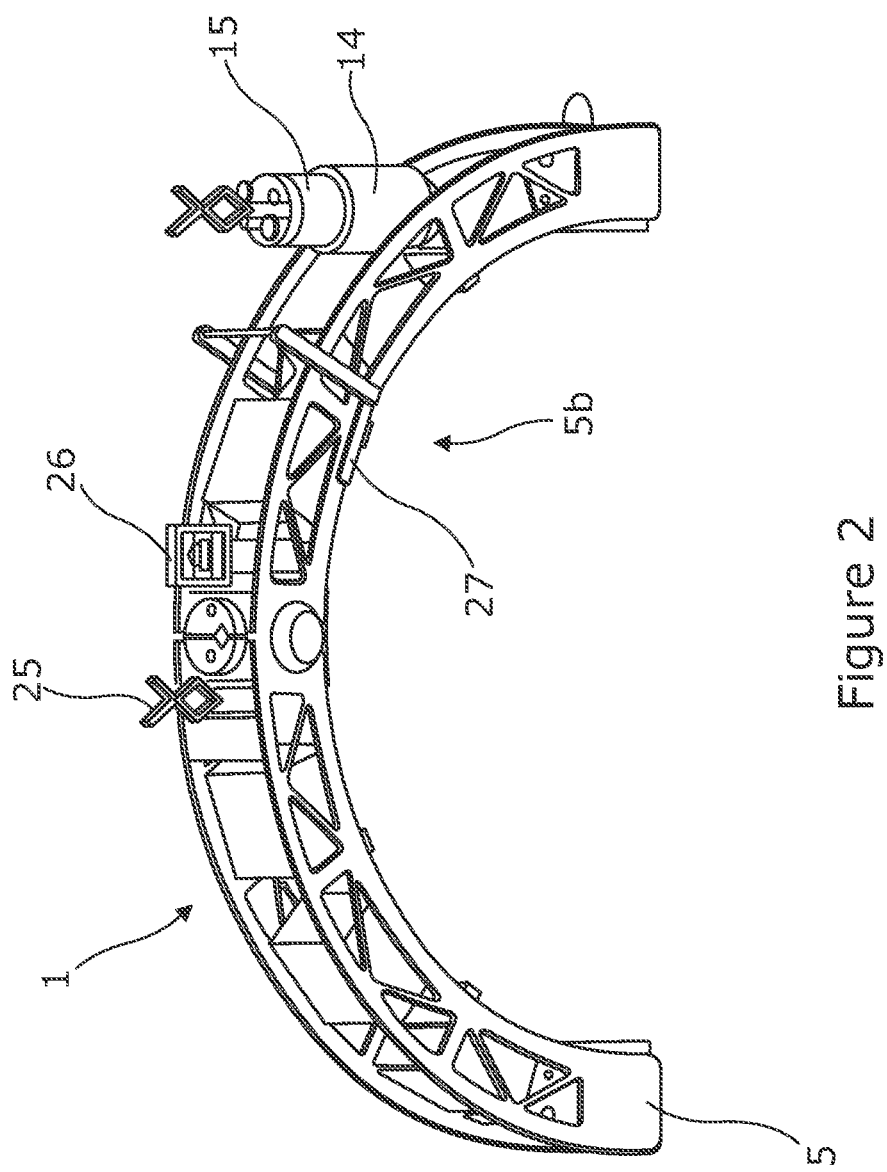
FIG. 2 is a perspective view of an opposite side of the strain gauge monitor of FIG. 1.

As best seen in FIG. 2, there is also provided an ROV fishtail handle 25, and an installation stand-off mechanism 26.

Also mounted are mounted on the main body of the strain monitor are buoyant entities 20.

The main body 5 of the strain monitor 1 comprises a coupling 14 arranged to locate a data collection module 15. This allows the data collection module 15 to be detachably connectable to the main body 5. The coupling 14 comprises an electrical socket which allows signals from the strain gauges to be received by the module, when in a connected condition.

Figure 8:
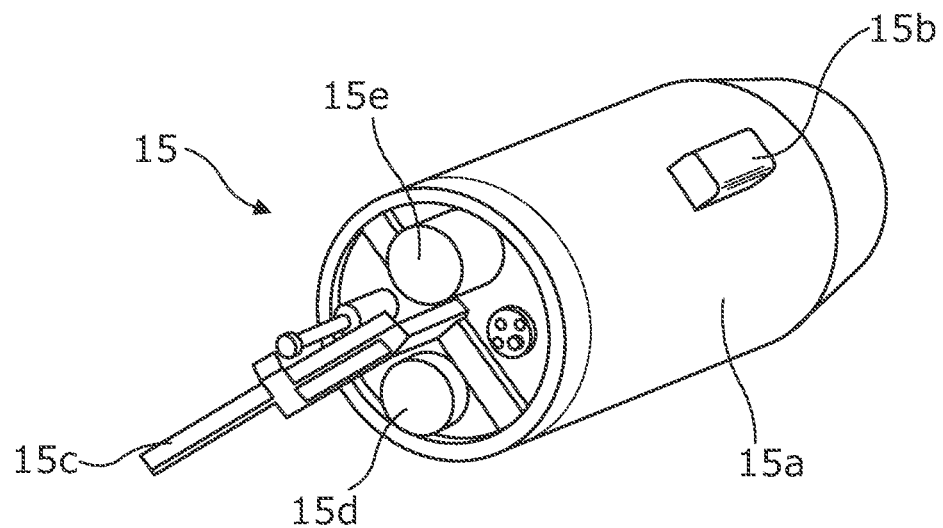
FIGS. 8 and 9 are perspective views a data collection module.
Figure 9:
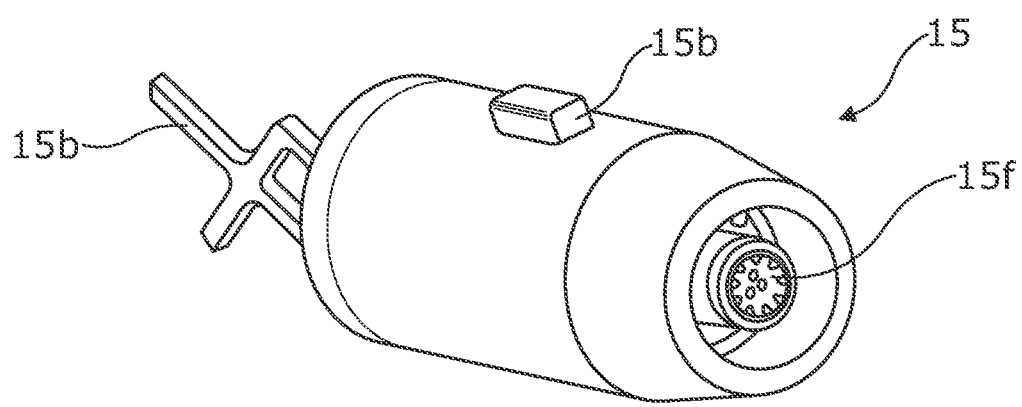

Reference is now made to FIGS. 8 and 9. The data collection module 15 comprises pressure vessel housing 15a, which is provided: with a male locating feature 15b, and internally of the module there is provided data acquisition and signal processing electronics. The module 15 also comprises an ROV handle 15c. and the module comprises an electrical coupling 15f. The ROV handle 15c is provided at the end of the module to be used to insert and remove the module from the coupling 14. 15d and 15e are comms ports for data transfer in the acoustic and optical domains, respectively.

Figure 10:
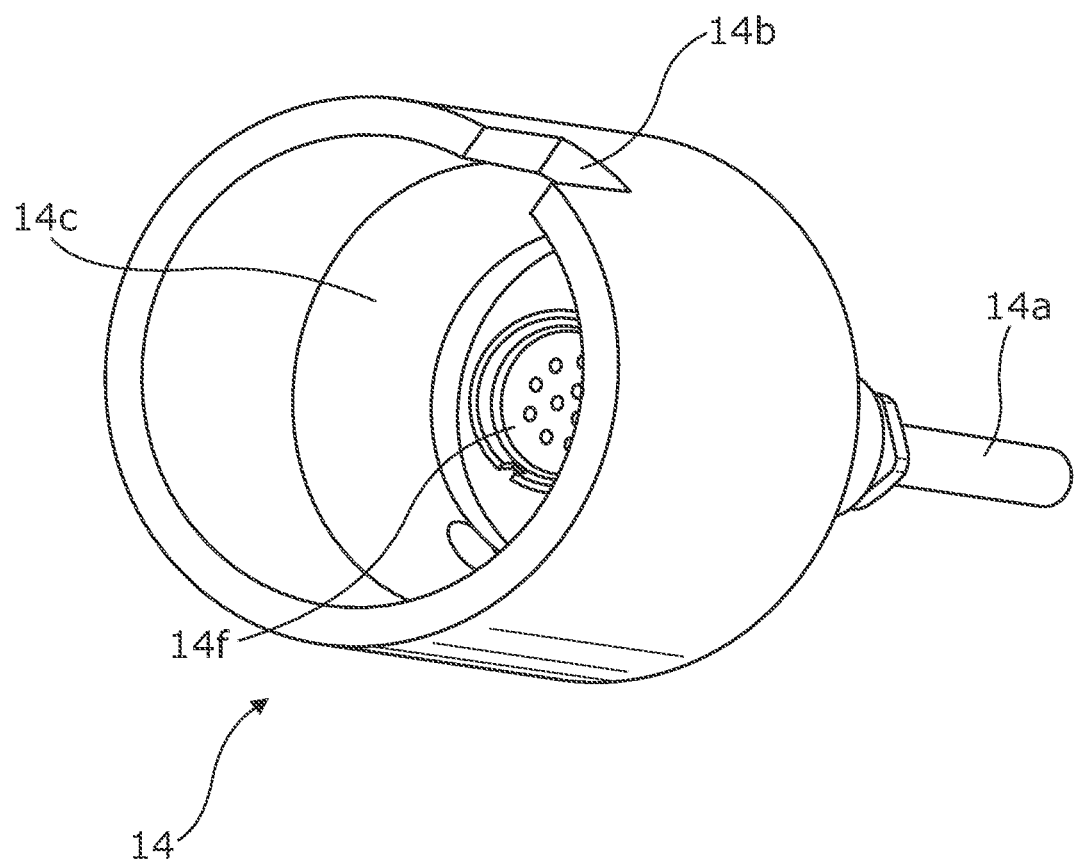
FIG. 10 is a perspective view of a receptacle which is arranged to receive the data collection module.

Reference is made to FIG. 10 which shows the mounting coupling 14, arranged to receive the module 15. The coupling comprises a recess forming a socket 14c. A defining wall of the recess comprises a cut-out 14b, which serves to locate the locating feature 15b of the module 15. The coupling also comprises an electrical connector which is connected to a cable 14a.

Figure 11:
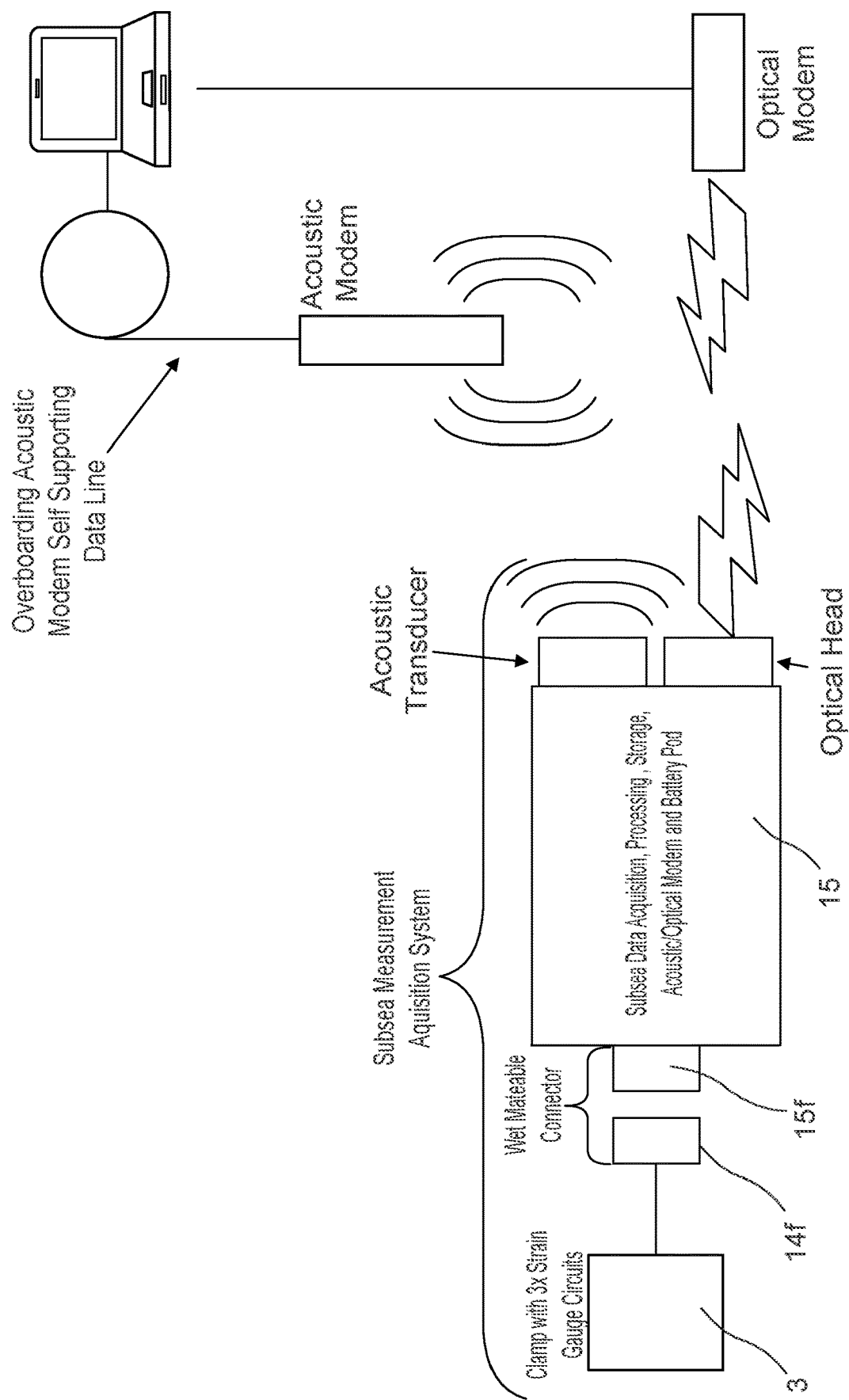
FIG. 11 is a schematic view of the data collection module's data transmission functionalities.

Data recovery, from the module may be achieved by one of several ways provided, such as module retrievable to surface and captured data being downloaded via a cable connection. Alternatively or in addition there may be provided an ROV carried optical modem, or an acoustic modem. Reference is made to FIG. 11 which schematically illustrates the latter two methods.

There is now described the procedure of installing the strain monitor to a brace member. Reference is made to use of an ROV, which is not shown for reasons of clarity.

Reference is made to FIG. 11. The strain monitor 1 is manoeuvred by the propulsion of the ROV towards the brace member 100. The ROV grips the strain monitor 1 using the fishtail handle 25 to achieve this.

Figure 12:
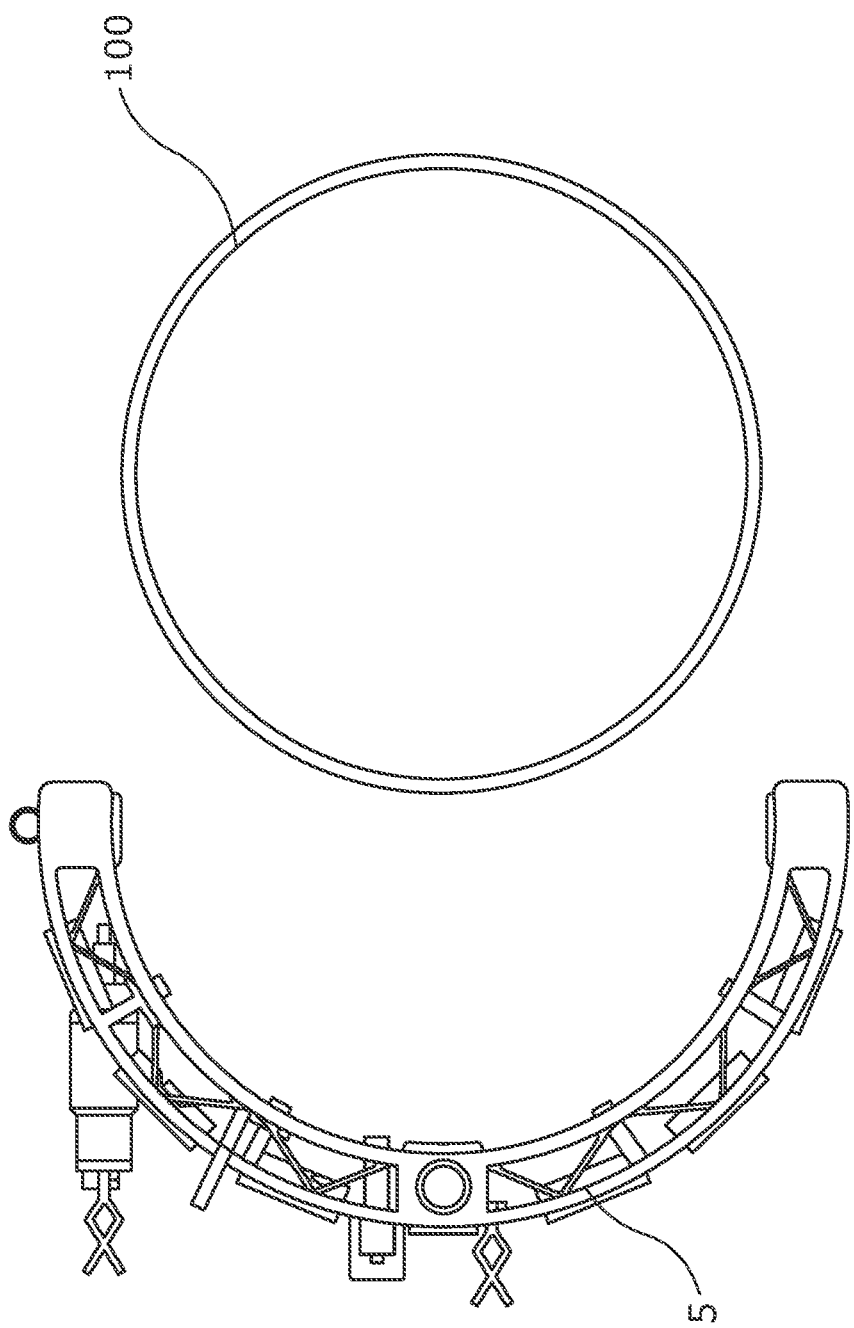
FIGS. 12 to 14 show the procedure of attaching the strain monitor to a submerged structure.
Figure 13:
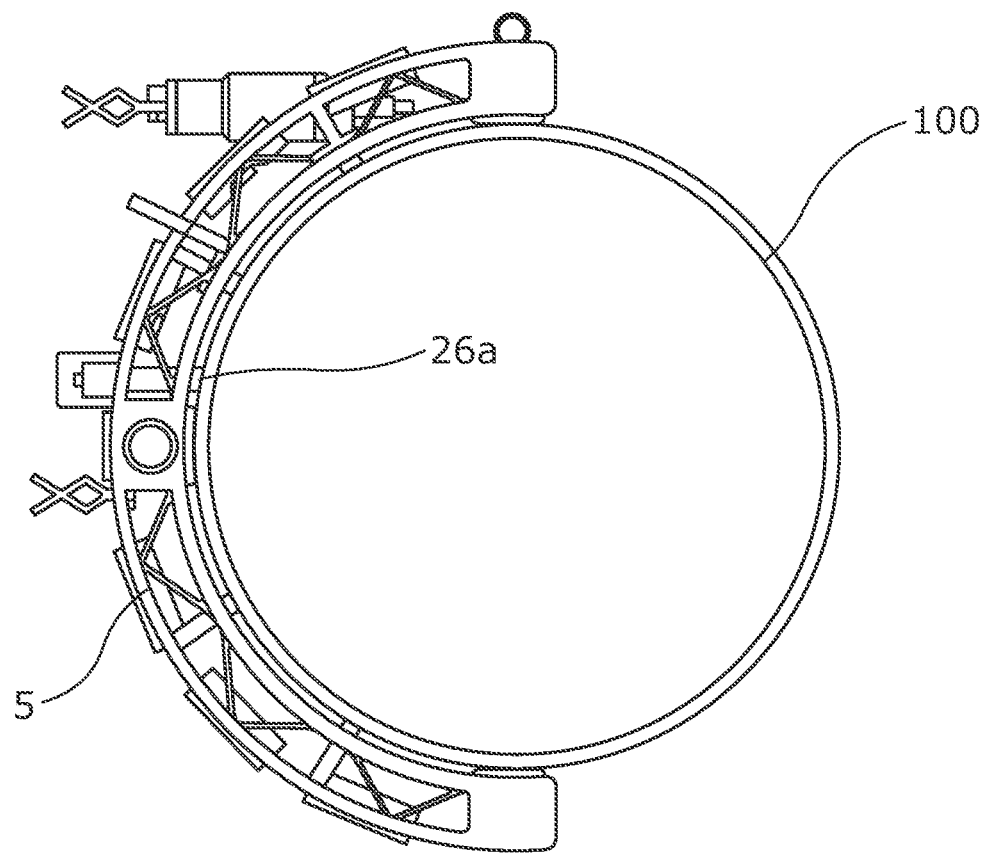

Referring to FIG. 12, the ROV brings the strain monitor into engagement with the brace 100. More specifically a moveable engagement portion 26a of the installation stand-off mechanism 26 engages with the outer surface of the brace member 100. This serves to prevent the magnets from causing the strain monitor to attach to the brace, by maintaining them in a spaced-apart relationship, as shown in FIG. 13. This advantageously serves to ensure that the attachment process is a controlled procedure. At this point the strain monitor 1 is located against the brace pipe. Very little magnet force should be experienced (by the ROV). The installation stand-off mechanism 26 comprises a closed D-handle, which is gripped by the ROV. The ROV positionally adjusts the strain monitor which may be moved until its position is correct relative to the brace member. Inclinometers provided on the strain monitor, and viewable by the ROV, can be used to help with alignment.

Figure 14:
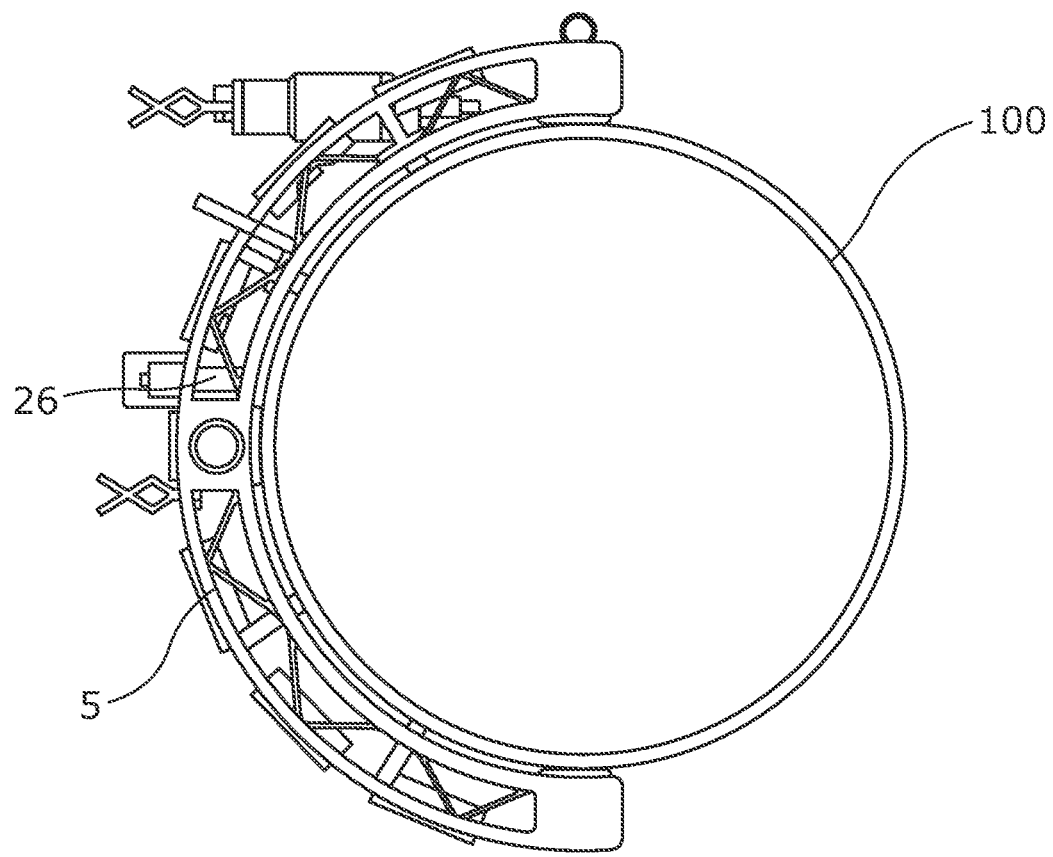

Once correctly aligned and positioned, the ROV releases the D-handles. This results in the component 26a, translating rearwardly. This allows the magnets to attach to the brace member 100. FIG. 14 shows the strain monitor in the attached condition.

The studs 6c provide positional stability and resistance to rotation in operational use. This is imperative, as once installed the gauge orientation must not alter in order for valid strain data analysis to be possible.

Advantageously, the strain monitor when installed does not affect flexural or vibration characteristics of the brace member during operation.

Figure 15:
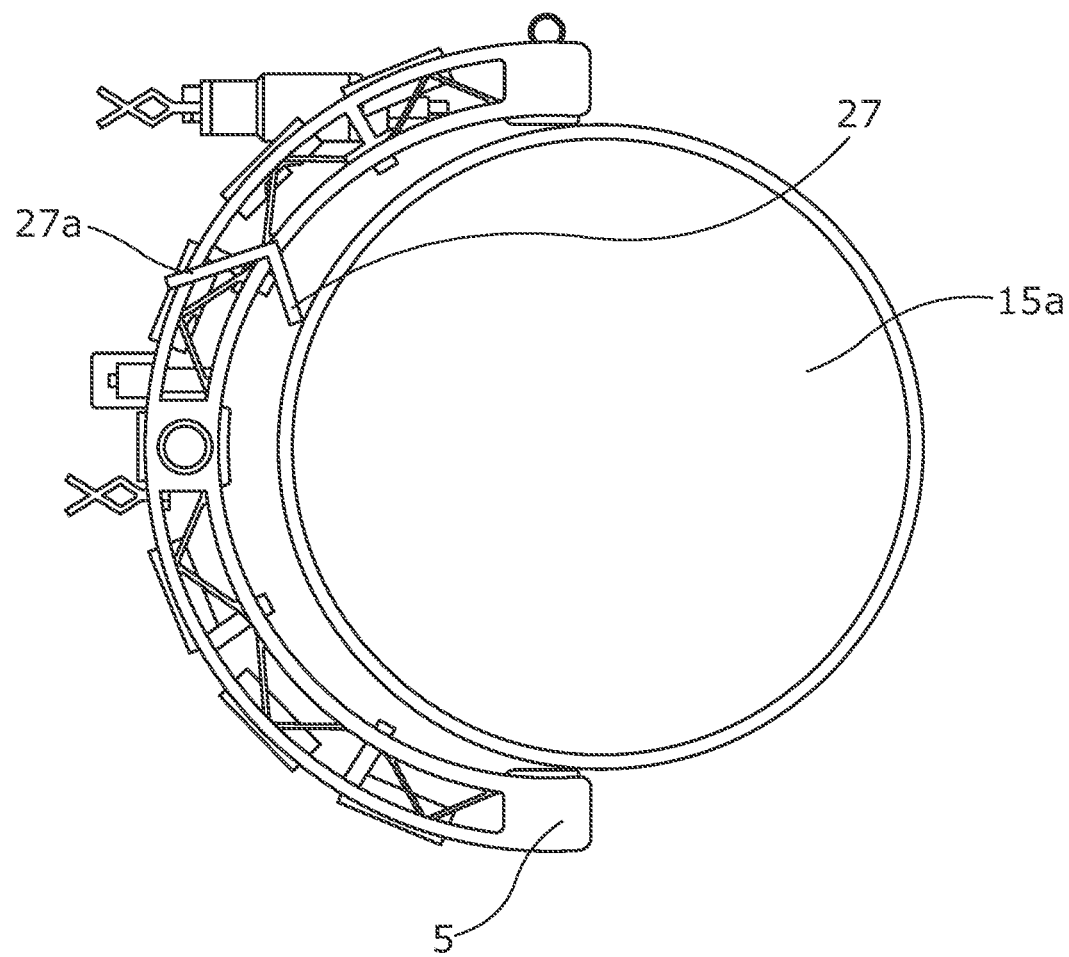
FIG. 15 shows the process of detaching the strain monitor from the submerged structure.

Reference is now made to FIG. 15, which shows the strain monitor removal or extraction procedure. The ROV may first remove the module 15 prior to executing this procedure, even though the module 15 is shown attached.

The ROV first holds the strain monitor 1 by the fishtail 25 and grips the handle 27a of the extraction mechanism 27 with the other manipulator. The ROV pulls the extraction handle, and in so doing rotates the mechanism. This applies a leverage to the brace member. The strain monitor 1 is thereby pushed away from the brace by a lever action. At this point strain monitor 1 may be pulled fully free of the brace using the fishtail handle 25.

In a variant embodiment a strain monitor is arranged to be attached to a flat, or substantially flat, surface of a submerged structure. The strain monitor comprises multiple strain gauge assemblies which are arranged in spaced apart fashion, arranged linearly or essentially in a two dimensional plane. Such a variant strain monitor may share some or all of the features and functionalities disclosed above in relation to the strain monitor 1. It will be readily understood however that because the variant strain gauge assembly is intended to attach to a flat surface of a submerged structure that its main body/support assembly will not be of curved shape of the strain monitor 1. For example, the variant strain monitor may comprise a main body which has a form factor with a principal dimension being a linear dimension.

The invention claimed is:

1. A strain monitor for attachment to part of a submerged structure to measure strain in said structure, the strain monitor comprising:

a main body, the main body comprising an attachment assembly which is arranged to secure the strain monitor to the submerged structure, the main body comprising an inner side which is arranged to be positioned opposite to a part of the submerged structure, and an outer side which is oppositely directed to the inner side and is arranged to face away from the submerged structure, a plurality of strain gauge assemblies, carried by the main body, arranged in a spaced apart relationship, and provided at the inner side, each strain gauge assembly comprising a strain gauge and a carrier, and the strain gauge attached to the carrier, with the strain monitor secured to the submerged structure and the strain gauge assembly arranged to selectively adopt a stowed condition and a deployed condition, wherein in the deployed condition, the carrier contacts the submerged structure, and in the stowed condition, the carrier is positioned away from contact with the submerged structure.

2. The strain monitor of claim 1, further comprising a handle used by a remotely operated vehicle (ROV) for installation and/or detachment of the strain monitor to and/or from the submerged structure, and/or operation of the strain monitor.

3. The strain monitor of claim 1, further comprising a deployment assembly to cause the strain gauge carrier to move from the stowed condition to the deployed condition.

4. The strain monitor of claim 1, wherein the main body is of concave shape.

5. The strain monitor of claim 1, further comprising a data collection module which is detachably connectable to the main body.

6. The strain monitor of claim 5, wherein the data collection module is arranged to effect at least one of the following functions: data processing, signal processing, data storage, data communication external of the strain monitor, and power management.

7. The strain monitor of claim 1, wherein the carrier is provided with three contact portions or formations, which when the carrier is in the deployed condition are arranged to bear against the part of the submerged structure.

8. The strain monitor of claim 3, wherein the deployment assembly comprises a spring, which when actuated is arranged to urge the strain gauge carrier into the deployed condition.

9. The strain monitor of claim 8, wherein the deployment assembly comprises a hydraulic chamber and fluid therein is arranged to maintain the carrier in the stowed condition.

10. The strain monitor of claim 1, further comprising one or more magnets to attach the strain monitor to the submerged structure.

11. The strain monitor of claim 1, wherein the strain monitor is configured to extend partially around the part of the submerged structure when attached to said part.

12. The strain structure of claim 1, wherein the strain monitor measures strain in the submerged structure via the strain gauge assemblies.

* * * * *